United States Patent Office 3,361,701
Patented Jan. 2, 1968

3,361,701
POLYAMIDE COMPOSITION CONTAINING A FATTY ACID ALKYLOLAMIDE AS PLASTICIZING AND ANTISTATIC AGENT
Heinz Polack, Marl, Heinz Juretzek, Munster, and Friedrich Seifert, Marl, Germany, assignors to Chemische Werke Huls Aktiengesellschaft, Marl, Germany, a corporation of Germany
No Drawing. Filed Aug. 12, 1965, Ser. No. 479,297
Claims priority, application Germany, Aug. 27, 1964, C 33,742
2 Claims. (Cl. 260—32.6)

ABSTRACT OF THE DISCLOSURE

A polyamide (or mixed polyamide) is plasticized and made antistatic by admixture with 2–30 wt. percent of a fatty acid alkylol amide of the formula

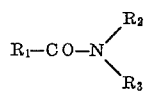

wherein $R_1$ is a member of the group consisting of saturated and unsaturated hydrocarbon groups containing 10–20 carbon atoms and $R_2$ and $R_3$ each stands for a member of the group consisting of hydroxyl terminated aliphatic groups containing 1–10 carbon atoms.

---

It is known to use aromatic sulfonic acid alkylamides and hydroxybenzoic acid esters for plasticizing polyamides and mixed polyamides. These plasticizers however do not have any noteworthy antistatic action or effect.

It is also known to produce oriented polyamide fibers and filaments having antistatic properties by the addition of a polyalkylene glycol ether having a molecular weight above 600 e.g. 10,000 to 20,000 to the polyamide, the ends of the polyether chains being blocked by aliphatic or aromatic groups.

The new antistatic, plasticized polyamides and mixed polyamides of the present invention are characterized by a content of 2 to 30% by weight, preferably 5 to 10% by weight of a fatty acid alkylol amide of the general formula

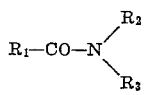

in which $R_1$ stands for a saturated or unsaturated aliphatic hydrocarbon group having from 10 to 20 carbon atoms and $R_2$ and $R_3$ each stands for an alkylol group having from 1 to 10 and preferably from 1 to 6 carbon atoms. The term "alklol group" embraces hydroxyl terminated aliphatic groups having 1–10, preferably 1–6, carbon atoms as well as the condensation products of such alcohols with ethylene-, propylene- and butylene glycols such as the mono-, di- and triethylene glycols, dipropylene glycol and their mixtures.

Examples of suitable polyamides and mixed polyamides are those having monomer units containing from 6 to 12 carbon atoms such as products known to those skilled in the art under the names:

Polyamid 6 _____ Polyamide from ε-aminocaproic acid (caprolactam).
Polyamid 11 _____ Polyamide from ω-aminoundecanoic acid (undecanoic acid lactam).
Polyamid 12 _____ Polyamide from ω-aminododecanoic acid (laurinlactam).
Polyamid 6, 6 _____ Polyamide from hexamethylenediamine and adipic acid.
Polyamid 6, 10 _____ Polyamide from hexamethylenediamine and sebacic acid.
Polyamid 6, 12 _____ Polyamide from hexamethylenediamine and decanedicarboxylic acid.
Polyamid 6/6, 6 _____ A mixed polyamide from Polyamid 6 and Polyamid 6, 6 (copolymerisate).
Polyamid 6/12 _____ A mixed polyamide from Polyamid 6 and Polyamid 12 (copolymerisate).
Polyamid 6/6, 6/12 ___ A mixed polyamide from Polyamid 6, Polyamid 6, 6 and Polyamid 12 (copolymerisate).
Polyamid 6/6, 12 ____ A mixed polyamide from Polyamid 6 and Polyamid 6, 12 (copolymerisate).

The antistatic, plasticized polyamides and mixed polyamides in accordance with the present invention are made by the addition of from 2 to 30% and preferably from 5 to 10% of a fatty acid alkylol amide to the molten, powdered, crushed or granulated polyamide. The resulting powder or granular mixture can be extruded in the usual way or homogenized in a kneader.

Small amounts of plasticizers of from 2 to 7% by weight can be worked directly into the polyamide in granular form. With larger amounts, that is, 10% by weight or more it is advisable to use the polyamide in powdered or crushed form which may contain granules.

In addition to the fatty acid alkylol amides described above mixtures of different substituted fatty acid alkylolamides may be introduced. The fatty acid alkylolamides can be mixed with known polyalkylene glycol ethers or with the usual plasticizers with the production of surprising synergistic effects.

Special advantages are shown by polyamides and mixed polyamides in which from 20 to 80% of the fatty acid alkylolamide plasticizer is substituted by a polyalkylene glycol ether, one end of the polyether chain of which is blocked by an aliphatic or aromatic group and the other end of which is blocked in the usual way by a hydrogen atom and the molecular weight of which is from 200 to 20,000. Thus a mixture of e.g. 100 parts by weight of "Polyamid 12" with 5 parts by weight of a fatty acid alkylolamide and 5 parts by weight of alkylphenol-polyglycol ether (molecular weight 529) gives a better antistatic effect than is obtained by the addition of 10 parts by weight of polyglycolether alone. For this purpose polyalkylethers having low molecular weights either above or below 600 may be used.

Example 1

The antistatic effect of the antistatic plasticizer of the present invention in different mixtures with "Polyamid 11" and "Polyamid 12" was compared with the antistatic effect of known antistatic and plasticizing agents. In the case of non-antistatic plasticizers 14 parts by weight of the plasticizer was added for each 100 parts by weight of polyamide as is customary with pure polyamides. For the antistatic effect alone only small amounts of the antistatic plasticizer were added. As Table 1 shows a significant plasticizing effect is observed even by small additions (5 to 10% by weight).

The homogenization of the mixtures was carried out in an extruder. Press plates and injection molded bodies were formed from the cut up extrudate. The degree of plasticization was determined as ball pressure hardness (VDE 0302, § 6) and the measured values are shown in Table 1.

As the measure of the antistatic effect the surface resistance was used (DIN 53, 482). These values in Table 2 show that the antistatic, plasticized polyamides in accordance with the invention, containing from 5 to 10% by weight of fatty acid alkylolamide, even after different kinds of conditioning, have a surface resistance of only $10^7$ ohms. The same is true of the mixtures which contain fatty acid alkylolamide and an alkylphenolpolyglycolether having a molecular weight of 529 in the ratio of 1 to 1. When polyglycolether is used alone the surface resistance is about ten times greater.

TABLE 1.—BALL PRESSURE HARDNESS—VDE 0302, §6

| Parts Polyamid 12 Weight | Parts Weight | Plasticizer | Ball Pressure Hardness | |
|---|---|---|---|---|
| | | | 10″ | 60″ |
| 100 | | | 1,050 | 950 |
| 100 | 14 | Benzene sulfonic acid butyl amide. | 580 | 540 |
| 100 | 14 | 2-ethyl-hexyl-p-hydroxy-benzoate. | 560 | 530 |
| 100 | 14 | Lauryl alcohol polyglycol ether (MG=362). | 600 | 550 |
| 100 | 5 | Coconut oil acid ($C_{12}$-$C_{18}$)-diethanol amide. | 810 | 760 |
| 100 | 10 | Coconut oil acid ($C_{12}$-$C_{18}$)-diethanol amide. | 700 | 650 |

TABLE 2.—SURFACE RESISTANCE DIN 53 482

| Parts, weight Polyamid | Parts weight | Antistatic Plasticizer | Surface Resistance, ohm | | | | |
|---|---|---|---|---|---|---|---|
| | | | A | B | C | D | E |
| 100, Polyamid 12 | | | $10^{13}$–$10^{14}$ | $10^{12}$–$10^{13}$ | $10^{11}$–$10^{12}$ | $10^{12}$–$10^{13}$ | $10^{12}$–$10^{14}$ |
| Do | 5 | Lauric acid diethanolamide | $6.10^7$ | $2.10^9$ | $1.10^8$ | $1.10^9$ | $1.10^9$ |
| Do | 10 | do | $1.10^7$ | $1.10^8$ | $6.10^7$ | $2.10^7$ | $7.10^7$ |
| Do | 5 | Coconut oil acid ($C_{12}$-$C_{18}$)-diethanolamide | $5.10^7$ | $5.10^9$ | $6.10^9$ | $2.10^7$ | $6.10^7$ |
| Do | 10 | do | $(5.10^7)$ | $3.10^8$ | $5.10^8$ | $4.10^7$ | $5.10^7$ |
| Do | 5 / 5 | Nonylphenolpolyglycolether (MG529) / Coconut oil acid ($C_{12}$-$C_{18}$)-diethanolamide | $2.10^7$ | $8.10^7$ | $2.10^8$ | $4.10^7$ | $4.10^7$ |
| Do | 10 | Nonylphenolpolyglycolether (MG529) | $4.10^8$ | $1.10^{10}$ | $6.10^9$ | $6.10^8$ | $1.10^9$ |
| 100, Polyamid 11 | 5 | Coconut oil acid diethanolamide | $2.10^8$ | $4.10^9$ | $6.10^9$ | $5.10^7$ | $4.10^7$ |
| Do | 10 | do | $2.10^7$ | $2.10^8$ | $5.10^8$ | $5.10^7$ | $4.10^7$ |

A=Untreated fresh product. B=After 24 hours in distilled water at 20°. C=After 7 days in distilled water at 20°. D=After 14 days in normal atmosphere. E=After 14 days drying over $P_2O_5$.

We claim:
1. An antistatic, plasticized composition consisting essentially of a member selected from the group consisting of polyamides and mixed polyamides containing from 2 to 10% by weight of a fatty acid alkylol amide of the general formula

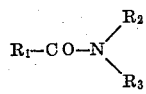

in which $R_1$ is a member selected from the group consisting of saturated and unsaturated hydrocarbon groups containing from 10 to 20 carbon atoms and $R_2$ and $R_3$ each stands for a member selected from the group consisting of hydroxyl terminated aliphatic groups containing from 1 to 10 carbon atoms and condensation products of such hydroxyl-terminated aliphatic groups with glycols of the group consisting of ethylene-, propylene- and butylene glycols.

2. An antistatic, plasticized composition consisting essentially of a member selected from the group consisting of polyamides and mixed polyamides containing from 2 to 10% by weight of a mixture of from 80 to 20% of a fatty acid alkylol amide of the general formula

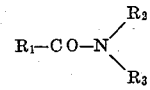

in which $R_1$ is a member selected from the group consisting of saturated and unsaturated hydrocarbon groups containing from 10 to 20 carbon atoms and $R_2$ and $R_3$ each stands for a member selected from the group consisting of hydroxyl terminated aliphatic groups containing from 1 to 10 carbon atoms and condensation products of such hydroxyl-terminated aliphatic groups with glycols of the group consisting of ethylene-, propylene- and butylene glycols and 20 to 80% by weight of a polyalkyleneglycolether having a molecular weight within the range from 200 to 20,000 and one of whose polyether chain ends is blocked by a member selected from the group consisting of aliphatic and aromatic groups.

References Cited

UNITED STATES PATENTS 2,665,443  1/1954  Simon et al.
3,197,425  7/1965  Konig et al. _____ 260—32.6

FOREIGN PATENTS 730,393  5/1955  Great Britain.

MORRIS LIEBMAN, *Primary Examiner.*

L. T. JACOBS, *Assistant Examiner.*